Patented Oct. 13, 1953

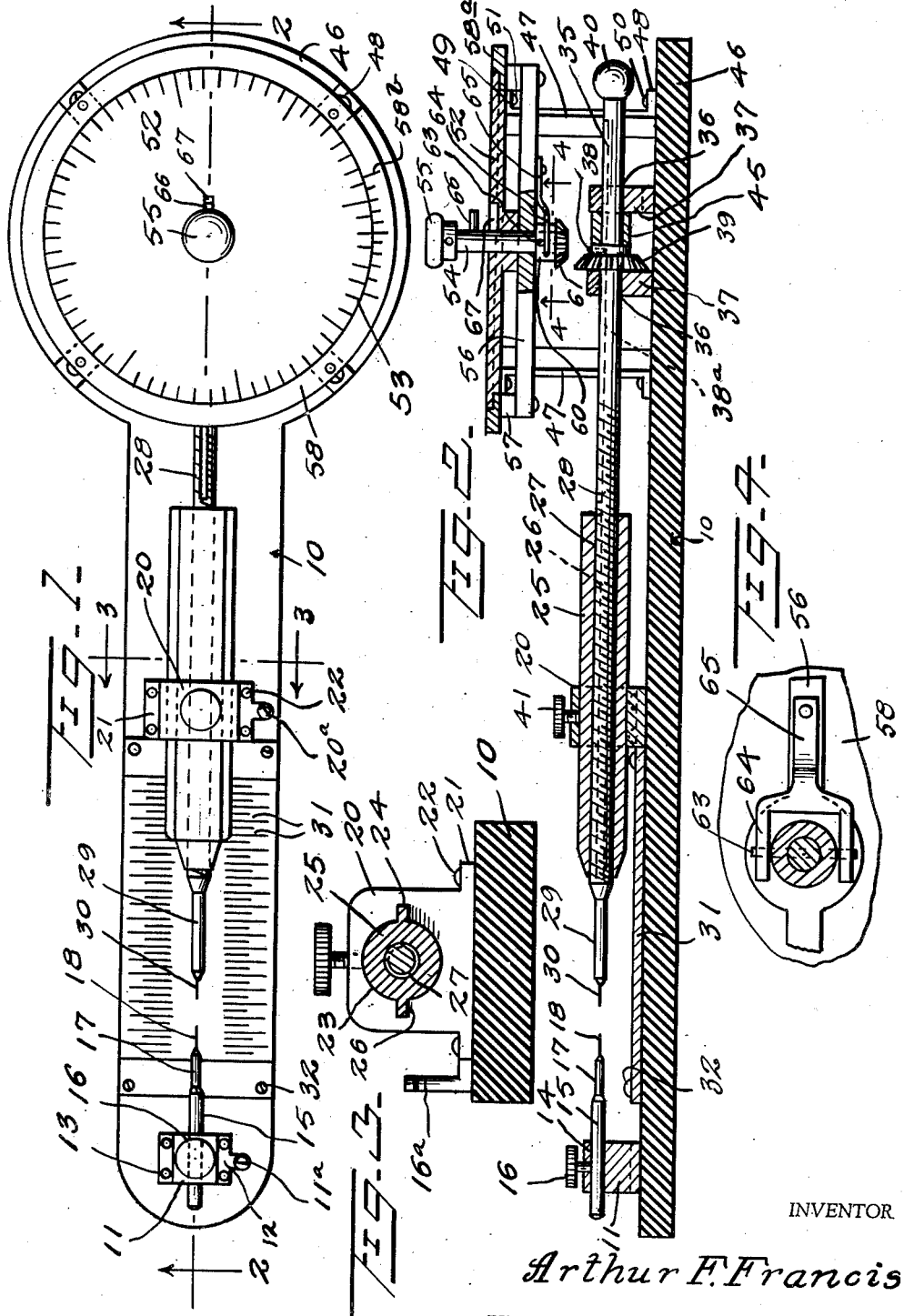

2,654,956

UNITED STATES PATENT OFFICE 2,654,956

MEASURING INSTRUMENT

Arthur F. Francis, Newark, N. J.

Application August 27, 1951, Serial No. 243,789

3 Claims. (Cl. 33—147)

1

This invention relates to a precision measuring instrument and has as its primary object the provision of such a device which may be utilized to provide a substantially micrometric effect in measuring minute distances.

A further object of the invention is the provision of a device of this character which may be readily applied to a variety of measurements of the most minute articles, and having a primary adjustment and a vernier attachment for subsequent fine adjustment.

An additional object of the invention is the provision of a device of this character having removable measuring points whereby a variety of implements may be substituted therefor if desired.

Still another object of the invention is the provision of a device of this character provided with metallic measuring points and contact members whereby electrical current may be applied to these points for the purpose of varying the frequency and electrical characteristics of the research field between said points.

Still other objects reside in the combinations of elements, arrangement of parts and features of construction, all as will be more fully pointed out hereinafter and disclosed in the accompanying drawing wherein there is shown a preferred embodiment of this inventive concept.

In the drawings:

Figure 1 is a top plan view of one form of device embodying features of the instant invention, Figure 2 is a longitudinal sectional view taken substantially along the line 2—2 of Figure 1, as viewed in the direction indicated by the arrows, Figure 3 is a transverse sectional view taken substantially along the line 3—3 of Figure 1, as viewed in the direction indicated by the arrows, Figure 4 is a fragmentary sectional view taken substantially along the line 4—4 of Figure 2, as viewed in the direction indicated by the arrows.

Similar reference characters refer to similar parts throughout the several views of the drawing.

Having reference now to the drawing in detail, there is generally indicated at 10 a base, preferably comprised of any suitable insulating material. One end of the base carries a bracket 11 provided with flanges 12 secured to the base 10, as by means of suitable screws 13. Bracket 11 is provided with a longitudinally extending bore 14 within which is seated a cylindrical element 15 adapted to be held in the desired position by a set screw 16. The element 15 has a removable tip portion 17 terminating in a sharp pointed extremity 18.

2

A second bracket 20 is carried by the base 10 in longitudinal alignment with the bracket 11 and is also provided with flanges 21 secured to the plate as by means of screws 22. Bracket 20 has a relatively large longitudinally extending bore 23 therethrough, provided with oppositely disposed grooves or channels 24 within which is positioned a sleeve 25 having flanges 26 extending into the channels 24 whereby the sleeve may be moved longitudinally of bracket 20 but not rotated relative thereto.

Sleeve 25 is provided with a longitudinally disposed centrally positioned central bore 27 within which extends a threaded rod 28, the latter being provided at its extremity with a removable reduced portion 29 terminating in a measuring pin 30 adapted to be positioned in exact alignment with opposed pin 18. A suitable measuring scale 31 is adapted to be secured between brackets 11 and 20 on base 10, as by means of screws 32 or the like, whereby the distance between pins 18 and 30 may be readily determined in approximate relation. More exact measurements are obtained in a manner to be more fully described hereinafter.

The opposite end of threaded member 28 is provided with a smooth portion 35 extending through suitable bores 36 in a pair of spaced bracket members 37.

A bevel gear 39 is slidably and non-rotatably mounted on shaft 28 between the brackets 37, having a key pin 38 engaging in the keyway 38a. The outer end of portion 35 is provided with a knob 40 whereby release of a set screw 41 carried by bracket 20 and engageable with sleeve 25 will permit movement of the entire assembly, including pin 30, rod 28 and sleeve 25 linearly relative to bracket 20.

A block 45 positioned between gear 30 and one of the supporting brackets 37 serves to position the gear 39 in fixed relation against the opposite supporting bracket 37.

Insulating base 10 is provided with a circular extremity 46 which carries suitable radially disposed supporting members 47 in spaced relation thereabout, the members 47 being provided with flanged portions 48 secured to the base 10 as by means of screws or the like 49. The upper portions of supports 47 carry corresponding flanges 50 to which are secured as by means of screws 51, a flanged supporting plate 58 which carries in a central recess a plate or disc 52 marked with suitable radially disposed indicia 53 which may be indicative of any desired measurement of distance, and plate 58 is marked with vernier indications 58b.

Plates 52 and 58 are provided with central apertures through which extends a shaft 54 provided at its upper extremity with a knob 55, the shaft 54 extending downwardly through a suitable aperture in a supporting bar 56 carried by depending lugs 57 secured to the underside of the rim 58a of plate 58 upon which the rotatable disc 52 is mounted.

The lower end of shaft 54 carries a collar 60 provided at its lower extremity with a bevel gear 61 adapted when the shaft 54 is pushed downwardly to engage bevel gear 39. Collar 60 is provided with a radially extending pin 63 adapted to be engaged by the fork 64 of a bifurcated leaf spring 65 secured in any desired manner to the underside of supporting bar 56, and normally biasing shaft 54 upwardly and hence gear 61 out of engagement with gear 39.

The portion of shaft 54 above disc 52 is provided with a pin 66 which is adapted to be engaged in a slot 67 in the surface of rotatable disc 52, whereby when knob 55 is pressed downwardly it may be rotated until pin 66 engages in slot 67, whereupon rotation of knob 55 will serve to rotate gear 39, thus moving threaded member 28 within sleeve 25, and consequently pin 30 relative to pin 18, to provide accurate measurements of the distances therebetween.

It will thus be seen that a relatively rough adjustment may be obtained by release of the set screw 41 and linear movement of the rod and sleeve assembly by means of knob 40, and that extremely accurate measurement may be provided by subsequent tightening of the set screw 41 and rotating the threaded shaft by means of the knob 55.

Both members 11 and 20 may be provided with suitable electrical terminals 11a and 20a respectively, by means of which an electrical current may be passed through the material contacted by the pins 18 and 30 for varying the frequency and electrical characteristics of the research field as desired. The members 17 and 29 may be removed if desired and various implements substituted therefor for the purpose of fine precision work on specimens or the like positioned on the plate 31. Obviously such specimens may be exposed to any desired radiation such as infra-red or ultra-violet rays, as well as radiation including the alpha, beta and gamma radiation of radio active material.

From the foregoing it will now be seen that there is herein provided an improved precision measuring instrument which accomplishes all of the objects of this invention and others, including many advantages of great practical utility and commercial importance.

As many embodiments may be made of this inventive concept and as many modifications may be made in the embodiment hereinbefore shown and described, it is to be understood that all matter herein is to be interpreted merely as illustrative and not in a limiting sense.

What I claim is:

1. In a precision measuring instrument a base, a pair of spaced supporting brackets carried by said base, each having a longitudinal bore therethrough, a rod slidably carried in one of said bores, means for fixing said rod in said bore, an elongated sharply pointed measuring needle carried by said rod, an internally threaded sleeve slidably mounted in the other of said bores, means securing said sleeve against rotation, a threaded rod rotatable in said threaded sleeve, a second elongated sharply pointed measuring needle carried by said threaded rod aligned with said first mentioned needle, a fixed linear scale on said base below said needles, and aligned therewith, means for rotating said threaded rod, a second scale movably supported by said base adjacent to and connectable with said threaded rod and calibrated to measure linear movement of said second measuring needle occasioned by such rotation, said threaded rod being provided with an unthreaded end portion having a keyway, a gear having a key thereon engaging said keyway in said rod and rotatable with said rod, said key and keyway permitting linear movement of said rod relative to a second gear, additional spaced supporting brackets for the unthreaded portion of said rod, gears releasably engageable with said first mentioned gear, means for selectively engaging and disengaging said gears, and means for rotating said second gear.

2. The structure of claim 1 wherein said gears are right angularly disposed bevel gears and said second gear is mounted on a vertically movable shaft and wherein, a supporting frame for said shaft is mounted on said base, and wherein said second scale comprises a disc having indicia thereon carried by said supporting frame, locking means for connecting said shaft and said second scale when said gears are engaged for simultaneous rotation, and spring means carried by said supporting frame normally biasing said gears out of engagement.

3. The structure of claim 1 wherein said base is comprised of insulating material and said brackets, rods and needles of electrical conductive material, terminals for conducting electric current to said needles whereby the introduction of contacting conductive material between said needles will close an electric circuit.

ARTHUR F. FRANCIS.

References Cited in the file of this patent

UNITED STATES PATENTS

| Number | Name | Date |
|---|---|---|
| 1,451,281 | Sundh et al. | Apr. 10, 1923 |
| 1,589,184 | Levy | June 15, 1926 |
| 2,445,068 | Jackson | July 13, 1948 |

FOREIGN PATENTS

| Number | Country | Date |
|---|---|---|
| 5,175 | Switzerland | Mar. 24, 1892 |
| 14,359 | Switzerland | May 26, 1897 |
| 84,647 | Switzerland | Aug. 2, 1920 |
| 580,698 | France | Nov. 13, 1924 |
| 190,459 | Switzerland | July 16, 1937 |

OTHER REFERENCES

Publication, American Machinist (Sept. 10, 1931, page 407, copy in Library).